(12) United States Patent
Renke et al.

(10) Patent No.: US 11,318,817 B2
(45) Date of Patent: May 3, 2022

(54) ARTICULATING LOCATING AND RETENTION MEMBER

(71) Applicants: GM GLOBAL TECHNOLOGY OPERATIONS LLC, Detroit, MI (US); AGC Automotive Americas R&D, Inc., Ypsilanti, MI (US)

(72) Inventors: David T. Renke, Macomb, MI (US); Lee N. Hiltunen, Berkley, MI (US)

(73) Assignees: GM Global Technology Operations LLC, Detroit, MI (US); AGC Automotive Americas R&D, Inc., Ypsilanti, MI (US)

(*) Notice: Subject to any disclaimer, the term of this patent is extended or adjusted under 35 U.S.C. 154(b) by 172 days.

(21) Appl. No.: 16/857,718

(22) Filed: Apr. 24, 2020

(65) Prior Publication Data

US 2021/0331755 A1    Oct. 28, 2021

(51) Int. Cl.
*B60J 1/00* (2006.01)
*B60J 1/10* (2006.01)
*B62D 65/02* (2006.01)

(52) U.S. Cl.
CPC ............ *B60J 1/005* (2013.01); *B60J 1/10* (2013.01); *B62D 65/026* (2013.01); *B60Y 2304/07* (2013.01)

(58) Field of Classification Search
CPC ... B29L 2031/3052; B60J 1/005; B60J 1/006; B60J 1/02; B60J 1/08; B60J 1/10; B60J 1/18; B62D 65/026
USPC .... 296/84.1, 96.21, 146.15, 190.1, 191, 201
See application file for complete search history.

(56) References Cited

U.S. PATENT DOCUMENTS

| | | | | |
|---|---|---|---|---|
| 2010/0225138 A1* | 9/2010 | Lesle | ...................... | B60J 1/005 296/92 |
| 2010/0320806 A1* | 12/2010 | Senge | ...................... | B60J 1/005 296/201 |
| 2016/0159205 A1* | 6/2016 | Otani | ...................... | B60J 1/005 296/146.15 |
| 2018/0264917 A1* | 9/2018 | Renke | ...................... | B60J 1/005 |
| 2019/0225281 A1* | 7/2019 | Renke | ................... | B62D 27/06 |

FOREIGN PATENT DOCUMENTS

DE    19649762 A1 *   6/1998   ............. B60J 1/005
JP    05286360 A  *   2/1993

* cited by examiner

*Primary Examiner* — Jason S Daniels
(74) *Attorney, Agent, or Firm* — Quinn IP Law

(57) ABSTRACT

An alignment member includes a first body member having a first end and a second end longitudinally opposite the first end, a second body member having a first end and a second end longitudinally opposite the first end, the second body member coupled to the first body member such that the first and second body members define a longitudinal axis of the alignment member, a first base member coupled to the second body member, a second base member rotatably coupled to the first base member, and a locking mechanism configured to engage with the first base member. The first base member rotates relative to the second base member to position the alignment member from a first position to a second position and the locking mechanism engages with the first base member to retain the alignment member in the second position.

20 Claims, 4 Drawing Sheets

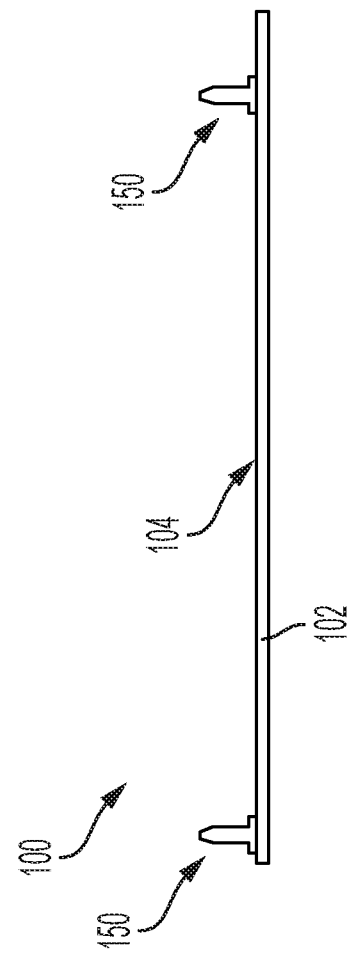
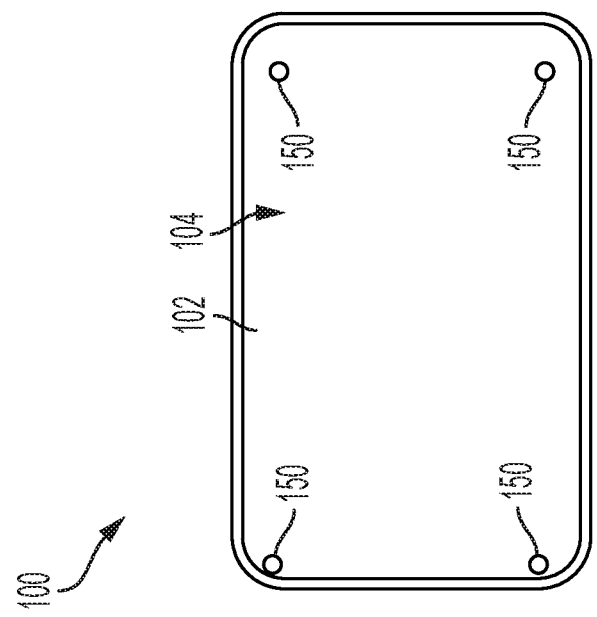

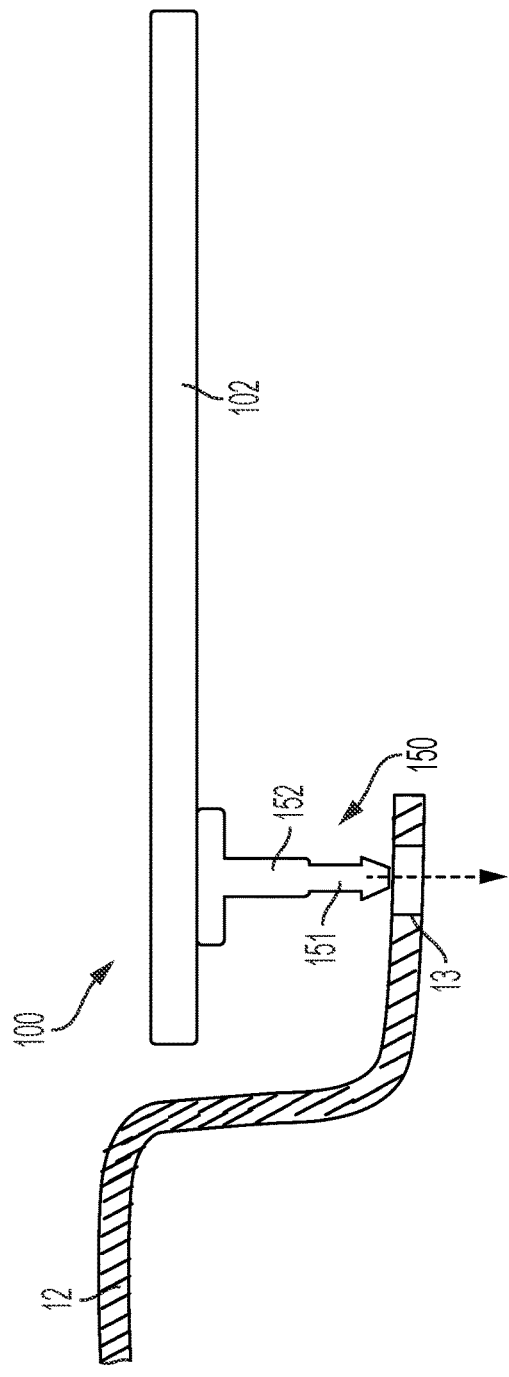
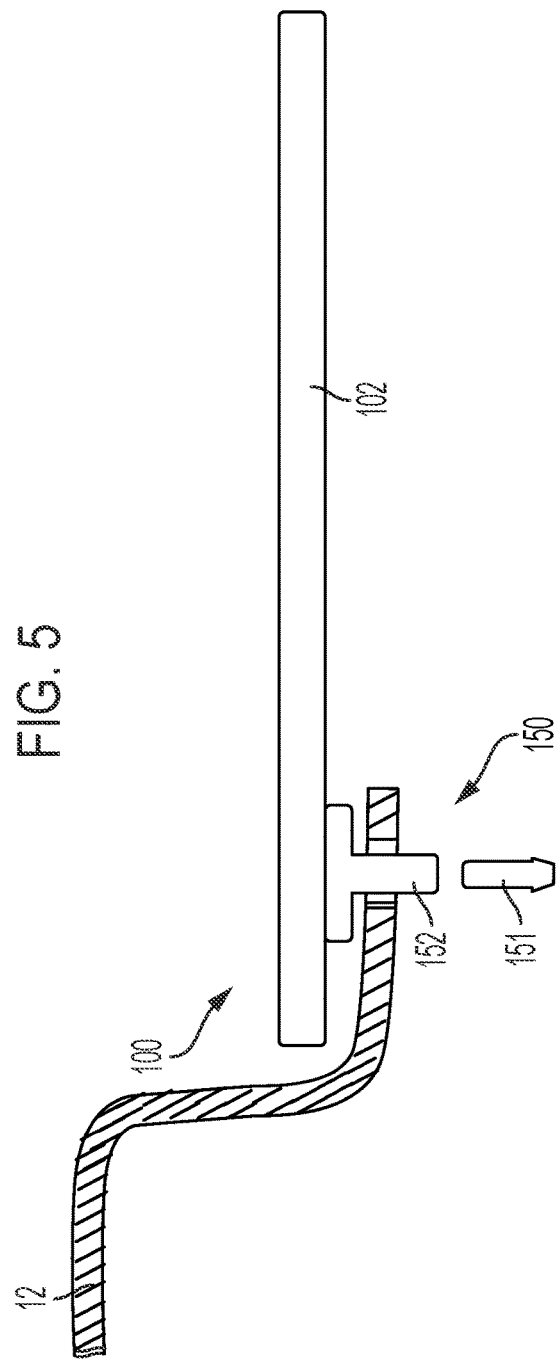

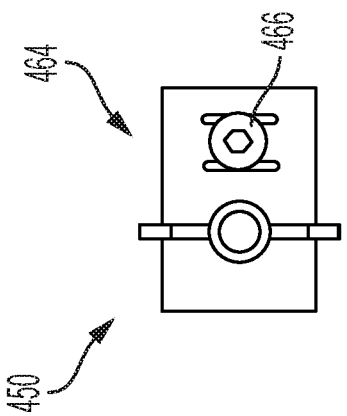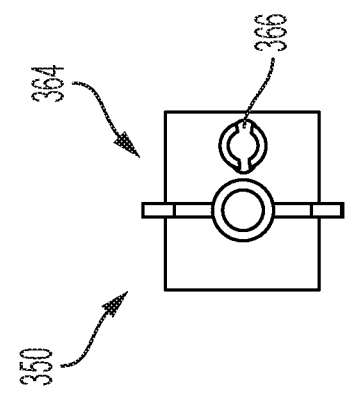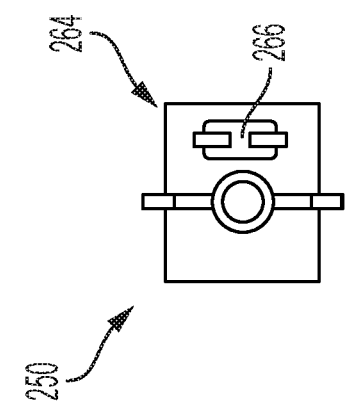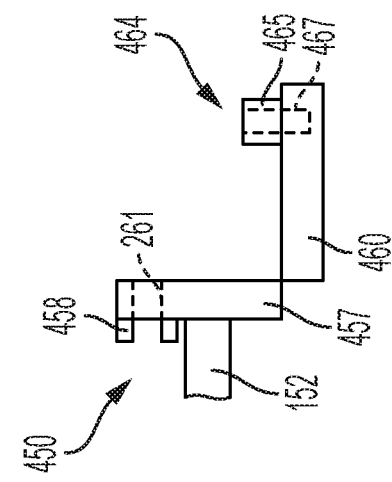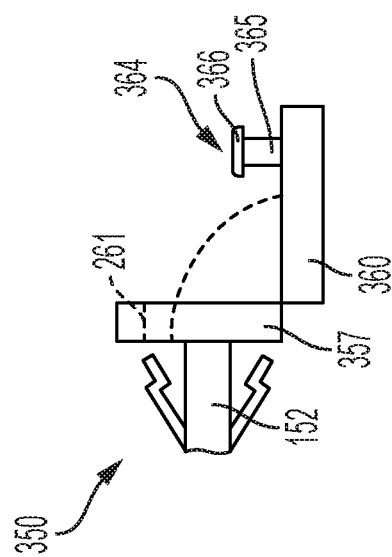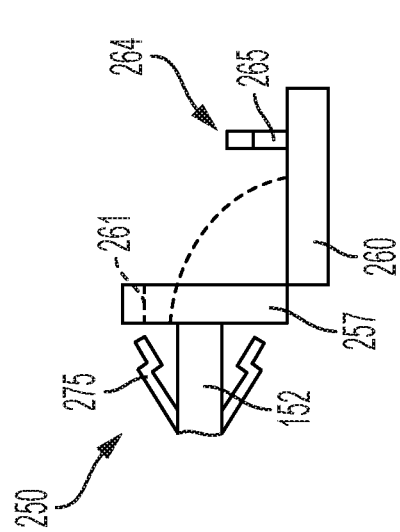

ARTICULATING LOCATING AND RETENTION MEMBER

INTRODUCTION

The present disclosure relates generally to an alignment and retention member such as a pin.

Alignment members or pins are used to align two components relative to each other during assembly. The use of alignment pins is useful when aligning components where the alignment cannot be verified visually. However, stationary alignment pins may also be difficult to align visually with the mating hole, resulting in component damage or additional manufacturing time and complexity. Furthermore, the length of stationary alignment pins may be constrained due to component storage and transportation assemblies.

SUMMARY

Embodiments according to the present disclosure provide a number of advantages. For example, embodiments according to the present disclosure enable alignment of two components during assembly using an articulating alignment and retention member that has an extended position and a collapsed position. In the extended position, the retention member is more visible to the installer. In the collapsed position, the retention member occupies a minimum package space.

In one aspect of the present disclosure, an alignment member includes a first body member having a first end and a second end longitudinally opposite the first end, a second body member having a first end and a second end longitudinally opposite the first end, the second body member coupled to the first body member such that the first and second body members define a longitudinal axis of the alignment member, a first base member coupled to the second body member, a second base member rotatably coupled to the first base member, and a locking mechanism configured to engage with the first base member. The first base member rotates relative to the second base member to position the alignment member from a first position to a second position and the locking mechanism engages with the first base member to retain the alignment member in the second position and the alignment member is configured to align a first component with a second component.

In some aspects, the first body member and the second body member form a cylindrical alignment pin.

In some aspects, the first body member is separable from the second body member.

In some aspects, the first position is a collapsed position in which the first and second body members are oriented parallel to the second base member.

In some aspects, the second position is an extended position in which the first and second body members are oriented perpendicular to the second base member.

In some aspects, the locking mechanism includes a locking member configured to engage with an upper surface of the first base member to retain the alignment member in the second position.

In some aspects, the locking mechanism is coupled to the second base member and the locking member is one of a locking tab, a wing lock, and a flexible cap.

In some aspects, the locking member is separable from the locking mechanism and includes one of a mechanical fastener and a clip.

In some aspects, the alignment member further includes at least one retention member flexibly coupled to the second body member.

In some aspects, the at least one retention member is an angled tab extending from the second body member and flexes between an unflexed position, a flexed position, and the unflexed position during an installation operation.

In another aspect of the present disclosure, an alignment member includes a first body member having a first end and a second end longitudinally opposite the first end, a second body member having a first end and a second end longitudinally opposite the first end, the first body member removably coupled to the second body member and the first and second body members defining a longitudinal axis of the alignment member, a retention member flexibly coupled to the second body member, a first base member coupled to the second body member, a second base member rotatably coupled to the first base member via a hinge member, and a locking mechanism coupled to the second base member and including a locking member configured to engage with the first base member. The first base member rotates relative to the second base member to position the alignment member from a first position to a second position and the locking mechanism engages with the first base member to retain the alignment member in the second position.

In some aspects, the first body member and the second body member form a cylindrical alignment pin.

In some aspects, the first position is a collapsed position in which the first and second body members are oriented parallel to the second base member.

In some aspects, the second position is an extended position in which the first and second body members are oriented perpendicular to the second base member.

In some aspects, the retention member is an angled tab extending from the second body member and the retention member flexes between an unflexed position and a flexed position during an installation operation.

In some aspects, the locking member is one of a locking tab, a wing lock, and a flexible cap.

In another aspect of the present disclosure, a vehicle assembly includes a component assembly including a first vehicle component, a second vehicle component, and an alignment member coupled to the first vehicle component and configured to align the first vehicle component with the second vehicle component. The alignment member includes a first body member having a first end and a second end longitudinally opposite the first end, a second body member having a first end and a second end longitudinally opposite the first end, the first body member removably coupled to the second body member and the first and second body members defining a longitudinal axis of the alignment member, a first base member coupled to the second body member, a second base member rotatably coupled to the first base member via a hinge member, and a locking mechanism coupled to the second base member and including a locking member configured to engage with the first base member. The first base member of the alignment member rotates relative to the second base member to position the alignment member from a first position to a second position, the locking mechanism engages with the first base member to retain the alignment member in the second position, and the alignment member engages with the second vehicle component to couple the first vehicle component with the second vehicle component.

In some aspects, the alignment member further includes a retention member flexibly coupled to the second body member.

In some aspects, the first position is a collapsed position in which the first and second body members are oriented parallel to the second base member and the second position is an extended position in which the first and second body members are oriented perpendicular to the second base member.

In some aspects, the locking member is one of a locking tab, a wing lock, and a flexible cap.

BRIEF DESCRIPTION OF THE DRAWINGS

The present disclosure will be described in conjunction with the following figures, wherein like numerals denote like elements.

FIG. 3 is a schematic bottom view of a component including a plurality of alignment and retention members, according to an embodiment.

FIG. 4 is a schematic side view of the component of FIG. 1, according to an embodiment.

FIG. 5 is a schematic partial cross-sectional view of a vehicle body including a component with an alignment and retention member in an uninstalled position, according to an embodiment.

FIG. 6 is a schematic partial cross-sectional view of the vehicle body including the component with the alignment and retention member in an installed position, according to an embodiment.

FIG. 7A is a schematic top view of an alignment and retention member with a first locking mechanism, according to an embodiment.

FIG. 7B is a schematic side view of the alignment and retention member and the first locking mechanism of FIG. 7A, according to an embodiment.

FIG. 8A is a schematic top view of an alignment and retention member with a second locking mechanism, according to an embodiment.

FIG. 8B is a schematic side view of the alignment and retention member and the second locking mechanism of FIG. 8A, according to an embodiment.

FIG. 9A is a schematic top view of an alignment and retention member with a third locking mechanism, according to an embodiment.

FIG. 9B is a schematic side view of the alignment and retention member and the third locking mechanism of FIG. 9A, according to an embodiment.

Figure 2:
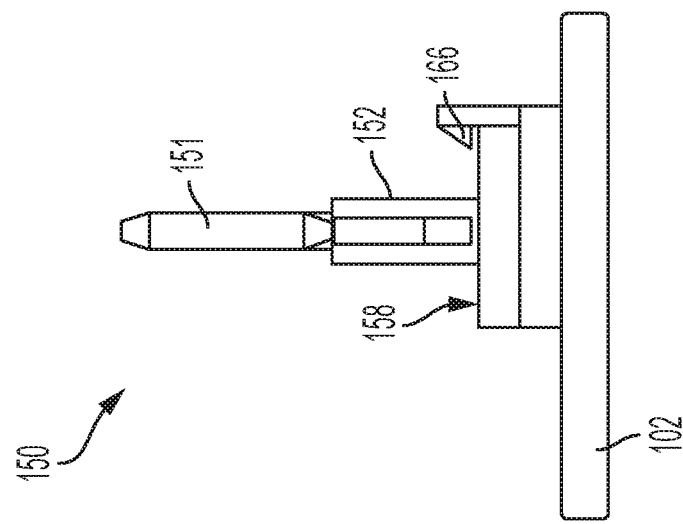
FIG. 2 is a schematic side view of an alignment and retention member in a second, or extended, position, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

During some assembly operations, visually aligning a locating/retention pin to a mating hole can be difficult. The alignment and retention member discussed herein includes an articulating locating/retention pin that can be rotated from a first position to a second position to align the alignment and retention member with the mating hole. In some embodiments, the alignment and retention member includes a locking mechanism to maintain the alignment and retention member in the second position during an installation or assembly operation.

Figure 1:
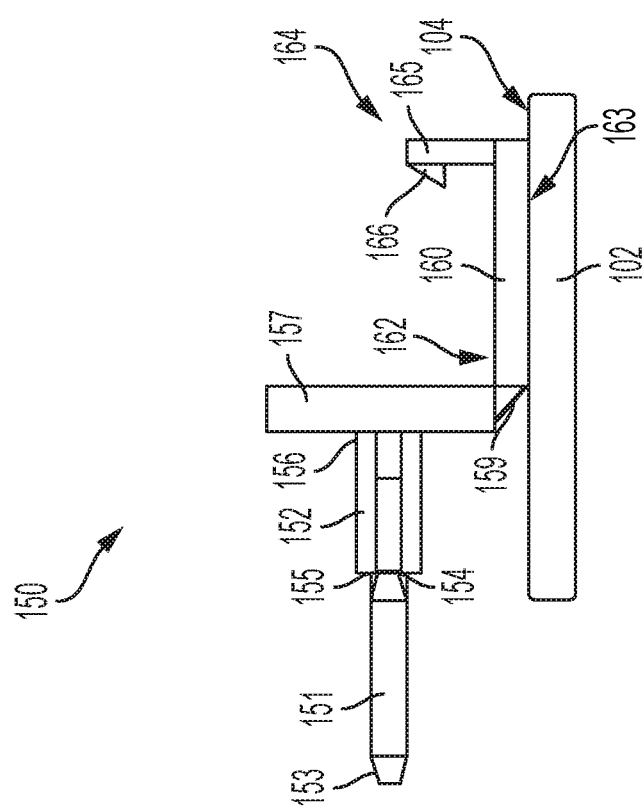
FIG. 1 is a schematic side view of an alignment and retention member in a first, or collapsed, position, according to an embodiment.

With reference to FIGS. 1 and 2, an alignment and retention member 150 includes a first body member 151 and a second body member 152. In various embodiments, the first body member 151 is a cylindrical member having a first end 153 and a second end 154 longitudinally opposite the first end 153. In various embodiments, the second body member 152 is a cylindrical member having a first end 155 and a second end 156 longitudinally opposite the first end 155. In various embodiments, the first and second body members 151, 152 form a cylindrical alignment pin.

The alignment and retention member 150 also includes a first base member 157 and a second base member 160. The first and second base members 157, 160 are rotatably coupled together at a hinge point. In various embodiments, the first and second base members 157, 160 are rotatably coupled via a hinge member 159 that is a separate mechanical hinge or a flexible member integrated with both of the first and second base members 157, 160, for example and without limitation.

A locking mechanism 164 is coupled to the second base member 160. In various embodiments, the locking mechanism 164 includes a vertical member 165 and a locking member 166. The locking member 166 is configured to engage with the first base member 157 when the alignment and retention member 150 is in the second position, as shown in FIG. 2 and discussed in greater detail herein. In various embodiments, the locking member 166 is a locking tang or tab that engages with an upper surface 158 of the first base member 157 to retain the alignment and retention member 150 in the second position. In various embodiments, the locking member 166 is a removable clip that engages with both the upper surface 158 of the first base member 157 and the second base member 160.

The first and second body members 151, 152 are coupled together and define a longitudinal axis of the alignment and retention member 150. The second end 154 of the first body member 151 is coupled with the first end 155 of the second body member 152. The second end 156 of the second body member 152 is coupled with the first base member 157. In various embodiments, the first and second body members 151, 152 are unitarily formed, that is, molded as a unitary component. In various embodiments, the first and second body members 151, 152 are separable at the second end 154 of the first body member 151 upon application of a force to the first body member 151. In other words, the first body member 151 is configured to breakaway or separate from the second body member 152 after an assembly operation.

The first and second body members 151, 152 rotate with the first base member 157 from a first, or collapsed, position, as shown in FIG. 1, to a second, or extended, position, as shown in FIG. 2. In the first position, the first and second body members 151, 152 are oriented parallel to the second base member 160. In the collapsed position, the alignment and retention member 150 is in a position that facilitates easier storage and transportation of the component to which the alignment and retention member 150 is affixed.

In various embodiments, the first and second body members 151, 152, the first base member 157 and the second base member 160 are formed as a single component, such as in a molding or other formation operation. In various embodiments, the first base member 157 is rotatably coupled with the second base member 160 via a separate mechanical hinge or a flexible component, such as plastic, for example and without limitation. In various embodiments, the alignment and retention member 150 is formed from a nylon material or other rigid material.

When the alignment and retention member 150 is in the second or extended position shown in FIG. 2, the first base member 157 is adjacent and parallel to an upper surface 162 of the second base member 160 and the first and second body members 151, 152 are oriented substantially perpendicular to the first and second base members 157, 160. The locking mechanism 164 permits rotation of the alignment and retention member 150 from the first, collapsed, or stored position shown in FIG. 1, to the second, or extended position shown in FIG. 2 but does not permit rotation of the alignment and retention member 150 from the second position to the first position. The locking member 166 of the locking mechanism 164 engages with the upper surface 158 of the first base member 157 to maintain the alignment and retention member 150 in the second position.

In various embodiments, the alignment and retention member 150 is adhesively coupled to a component, such as a glass sheet 102. In various embodiments, a bottom surface 163 of the second base member 160 is adhesively coupled to the glass sheet 102. The glass sheet 102 is, in some embodiments, side window glass for a vehicle. In other embodiments, the alignment and retention member 150 is coupled to any component for which line of sight installation is difficult, enabling component to component retention for various assembly operations.

With reference to FIGS. 3 and 4, in various embodiments, a component assembly 100 includes a plurality of alignment and retention members 150 coupled to the glass sheet 102, such as a side window glass for a vehicle. The plurality of alignment and retention members 150 are positioned near each of the corners of the glass sheet 102. In various embodiments, the alignment and retention members 150 are adhesively coupled to an interior-facing surface 104 of the glass sheet 102. During storage and transport of the component assembly 100, the plurality of alignment and retention members 150 are oriented in the first position, shown in FIG. 1. In this position, the alignment and retention members 150 do not interfere with pre-existing storage and transport systems for components, such as vehicle glass, for example. During an installation operation, each of the plurality of alignment and retention members 150 is rotated to the second position, shown in FIG. 2. In this position, the first body member 151 of each alignment and retention member 150 extend away from the interior-facing surface 104 of the glass sheet 102 (or interior-facing surface of the component to be installed), providing an alignment and locating feature of a longer length to enable easier assembly of the component.

FIGS. 5 and 6 further illustrate a vehicle assembly of the component assembly 100 with a vehicle body member 12. In many installation scenarios, the component assembly 100 is installed to the vehicle body member 12 in a recessed location. With the alignment and retention member 150 in the second or extended position, the alignment and location features provided by the extended first and second body members 151, 152 allow the operator to more easily install the component assembly 100 in areas where line of sight is limited.

As shown in FIG. 5, the alignment and retention member 150 is in the second, or extended position, and is aligned with an opening formed by an edge 13 in the vehicle body member 12. All of the first body member 151 and at least a portion of the second body member 152 extend through the opening in the vehicle body member 12 formed by the edge 13.

With reference to FIG. 6, the extended length of the first body member 151 is removable by detaching the first body member 151 from the second body member 152 where the two body members are joined together. As discussed herein, the first body member 151 can breakaway, or detach, from the second body member 152 to shorten the longitudinal length of the alignment and retention member 150 after installation of the component assembly 100 with the vehicle body member 12. The second body member 152 remains behind to retain the component, such as the glass sheet 102, to the vehicle body member 12. The breakaway feature of the alignment and retention member 150 accommodates tight packaging constraints with which the first body member 151 of the alignment and retention member 150 may otherwise interfere.

FIGS. 7A and B, 8A and B, and 9A and B illustrate various embodiments of locking mechanisms that can be used to retain the alignment and retention member 150 in the second, or extended, position. FIGS. 7A and B illustrate another embodiment of a locking mechanism 264 that can be used with an alignment and retention member 250. In this embodiment, the alignment and retention member 250 includes the second body member 152 coupled to a first base member 257. The first base member 257 is rotatably coupled to the second base member 260 as described herein. The first base member 257 includes an edge 261 defining an opening that passes longitudinally through the first base member 257.

The locking mechanism 264 includes a vertical member 265 and a locking member 266. The locking member 266 is rotatably coupled to the vertical member 265. In various embodiments, the locking member 266 is a wing lock configured to pass through the opening in the first base member 257. When the alignment and retention member 250 is rotated to the second position, the locking member 266 passes through the opening in the first base member 257. Rotation of the locking member 266 engages the locking member 266 with the upper surface of the first base member 257 to retain the alignment and retention member 250 in the second or extended position.

FIGS. 8A and B illustrate another embodiment of a locking mechanism 364 that can be used with an alignment and retention member 350. In this embodiment, the alignment and retention member 350 includes the second body member 152 coupled to the first base member 357. The first base member 357 is rotatably coupled to a second base member 360 as described herein. The first base member 357 includes an edge 261 defining an opening that passes longitudinally through the first base member 357. The locking mechanism 364 includes a vertical member 365 and a locking member 366. The locking member 366 is coupled to the vertical member 365. In various embodiments, the locking member 366 is a flexible cap configured to pass through the opening in the first base member 357. When the alignment and retention member 350 is rotated to the second position, the locking member 366 passes through the opening in the first base member 357. The locking member 366 engages with the upper surface of the first base member 357 to retain the alignment and retention member 350 in the second or extended position.

FIGS. 9A and B illustrate another embodiment of a locking mechanism 464 that can be used with an alignment and retention member 450. In this embodiment, the alignment and retention member 450 includes the second body member 152 coupled to the first base member 457. The first base member 457 is rotatably coupled to a second base member 460 as described herein. The first base member 457 includes an edge 261 defining an opening that passes longitudinally through the first base member 457. In various embodiments, the first base member 457 includes a support member 458 extending around at least a portion of the edge 261. The locking mechanism 464 includes a vertical member 465. The vertical member 465 includes an edge 467 defining an opening passing through the vertical member 465, and, in some embodiments, extending into at least a portion of the second base member 460. The locking mechanism 464 also includes a locking member 466. In various embodiments, the locking member 466 is a mechanical fastener such as a screw or bolt that is configured to pass through the openings in the first and second base members 457, 460. When the alignment and retention member 450 is rotated to the second position, the locking member 466 is inserted into the openings in the first and second base members 457, 460. The locking member 466 engages with the upper surface of the first base member 457 to retain the alignment and retention member 450 in the second or extended position.

It is understood that other means for retaining the alignment and retention member in the second or extended position may be used including, for example and without limitation, clips, retainers, or other fasteners separate from or attached to one or more of the components of the alignment and retention member.

In various embodiments, as shown in FIG. 7B, the alignment and retention member 250 includes one or more retaining members 275. Each of the retaining members 275 forms an angled tab extending from the second body member 152. In some embodiments, each of the retaining members 275 is flexible along their length and flexibly coupled to the second body member 152. The retaining members 275 are used, in some embodiments, to join a first component to a second component during an assembly process. The retaining members 275 flex inward or toward the second body member 152 as the alignment and retention member 150 passes through a mating hole and rebound to an unflexed position once the retaining members 275 have passed through the mating hole, thus securing the components together by applying pressure to the area surrounding the mating hole.

Several embodiments of an articulating pin are discussed herein. These embodiments enable alignment of a component, such as a vehicle window assembly, to the vehicle body when the window assembly has an offset relative to the vehicle body. Unlike a fixed length long pin, the embodiments herein include an articulating pin that is initially in a stowed position to maximize shipping pack density and is rotated to an extended position for vehicle assembly. At least a portion of the pin can "breakaway" from the pin body via hand force to minimize interference of the pin with other components once assembled.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to for additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or slates are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An alignment member, comprising:
a first body member having a first end and a second end longitudinally opposite the first end;
a second body member having a first end and a second end longitudinally opposite the first end, the second body member removably coupled to the first body member such that the first and second body members define a longitudinal axis of the alignment member;
a first base member coupled to the second body member;
a second base member rotatably coupled to the first base member; and
a locking mechanism configured to engage with the first base member;
wherein the first base member rotates relative to the second base member to orient the alignment member from a first position to a second position and the locking mechanism engages with the first base member to retain the alignment member in the second position and the alignment member is configured to align a first component with a second component.

2. The alignment member of claim 1, wherein the first body member and the second body member form a cylindrical alignment pin.

3. The alignment member of claim 1, wherein the first body member is separable from the second body member.

4. The alignment member of claim 1, wherein the first position is a collapsed position in which the first and second body members are oriented parallel to the second base member.

5. The alignment member of claim 1, wherein the second position is an extended position in which the first and second body members are oriented perpendicular to the second base member.

6. The alignment member of claim 1, wherein the locking mechanism includes a locking member configured to engage with an upper surface of the first base member to retain the alignment member in the second position.

7. The alignment member of claim 6, wherein the locking mechanism is coupled to the second base member and the locking member is one of a locking tab, a wing lock, and a flexible cap.

8. The alignment member of claim 6, wherein the locking member is separable from the locking mechanism and comprises one of a mechanical fastener and a clip.

9. The alignment member of claim 1 further comprising at least one retention member flexibly coupled to the second body member.

10. The alignment member of claim 9, wherein the at least one retention member is an angled tab extending from the second body member and flexes between an unflexed position, a flexed position, and the unflexed position during an installation operation.

11. An alignment member, comprising:
a first body member having a first end and a second end longitudinally opposite the first end;
a second body member having a first end and a second end longitudinally opposite the first end, the first body member removably coupled to the second body member and the first and second body members defining a longitudinal axis of the alignment member;
a retention member flexibly coupled to the second body member;
a first base member coupled to the second body member;
a second base member rotatably coupled to the first base member via a hinge member; and
a locking mechanism coupled to the second base member and including a locking member configured to engage with the first base member;
wherein the first base member rotates relative to the second base member to position the alignment member from a first position to a second position and the locking mechanism engages with the first base member to retain the alignment member in the second position.

12. The alignment member of claim 11, wherein the first body member and the second body member form a cylindrical alignment pin.

13. The alignment member of claim 11, wherein the first position is a collapsed position in which the first and second body members are oriented parallel to the second base member.

14. The alignment member of claim 11, wherein the second position is an extended position in which the first and second body members are oriented perpendicular to the second base member.

15. The alignment member of claim 11, wherein the retention member is an angled tab extending from the second body member and the retention member flexes between an unflexed position and a flexed position during an installation operation.

16. The alignment member of claim 11, wherein the locking member is one of a locking tab, a wing lock, and a flexible cap.

17. A vehicle assembly, comprising:
a component assembly including a first vehicle component, a second vehicle component, and an alignment member coupled to the first vehicle component and configured to align the first vehicle component with the second vehicle component, the alignment member comprising:
a first body member having a first end and a second end longitudinally opposite the first end;
a second body member having a first end and a second end longitudinally opposite the first end, the first body member removably coupled to the second body member and the first and second body members defining a longitudinal axis of the alignment member;
a first base member coupled to the second body member;
a second base member rotatably coupled to the first base member via a hinge member; and
a locking mechanism coupled to the second base member and including a locking member configured to engage with the first base member;
wherein the first base member of the alignment member rotates relative to the second base member to position the alignment member from a first position to a second position, the locking mechanism engages with the first base member to retain the alignment member in the second position, and the alignment member engages with the second vehicle component to couple the first vehicle component with the second vehicle component.

18. The vehicle assembly of claim 17, wherein the alignment member further comprises a retention member flexibly coupled to the second body member.

19. The vehicle assembly of claim 17, wherein the first position is a collapsed position in which the first and second body members are oriented parallel to the second base member and the second position is an extended position in which the first and second body members are oriented perpendicular to the second base member.

20. The vehicle assembly of claim 17, wherein the locking member is one of a locking tab, a wing lock, and a flexible cap.

* * * * *